Figure 1:
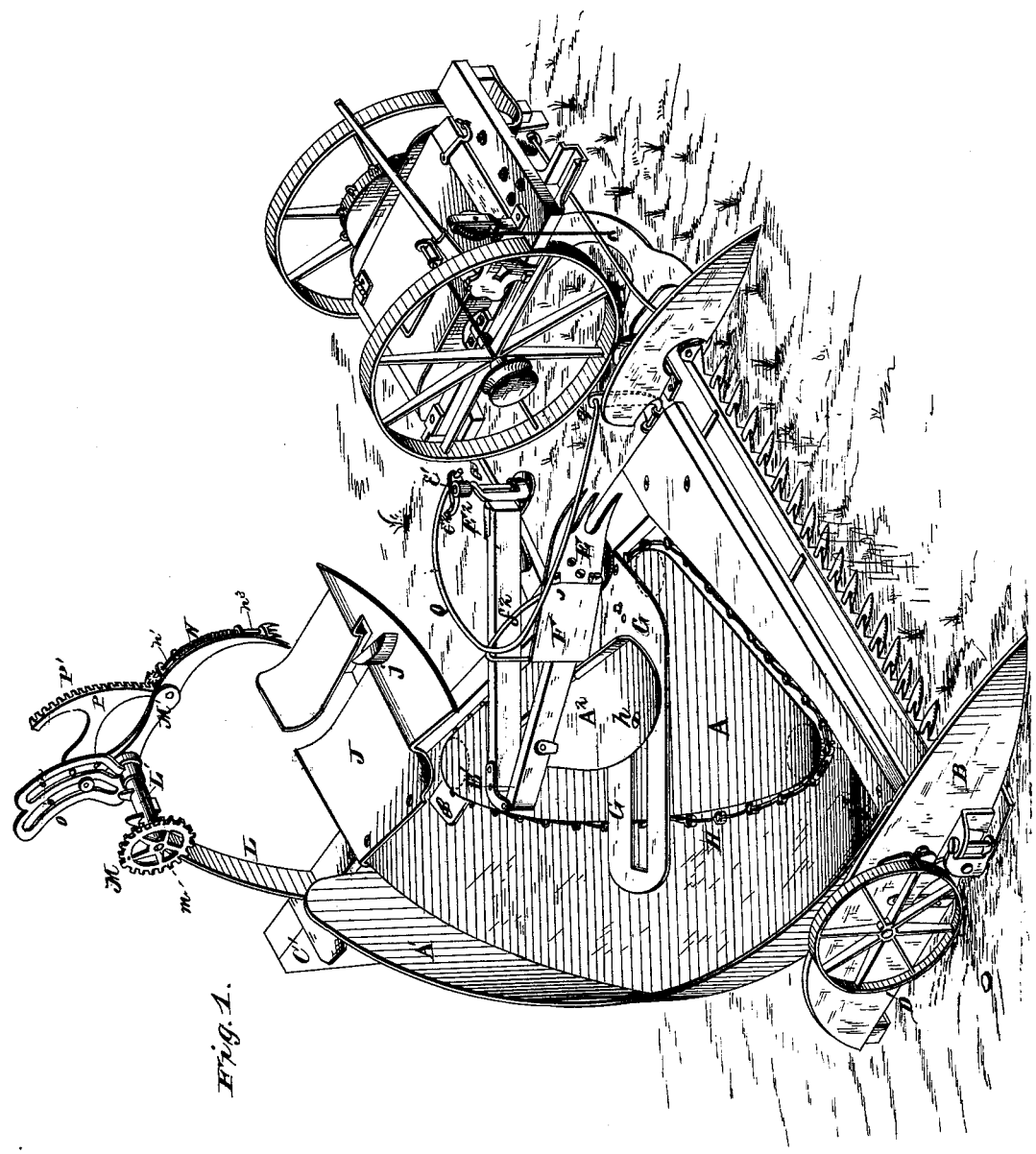

3 Sheets—Sheet 1.

J. F. SEIBERLING.
Grain-Binder.

No. 206,834. Patented Aug. 6, 1878.

WITNESSES
Franck L. Ourand
John G. Center

By

INVENTOR
Jno. F. Seiberling
A. M. Smith
Attorney

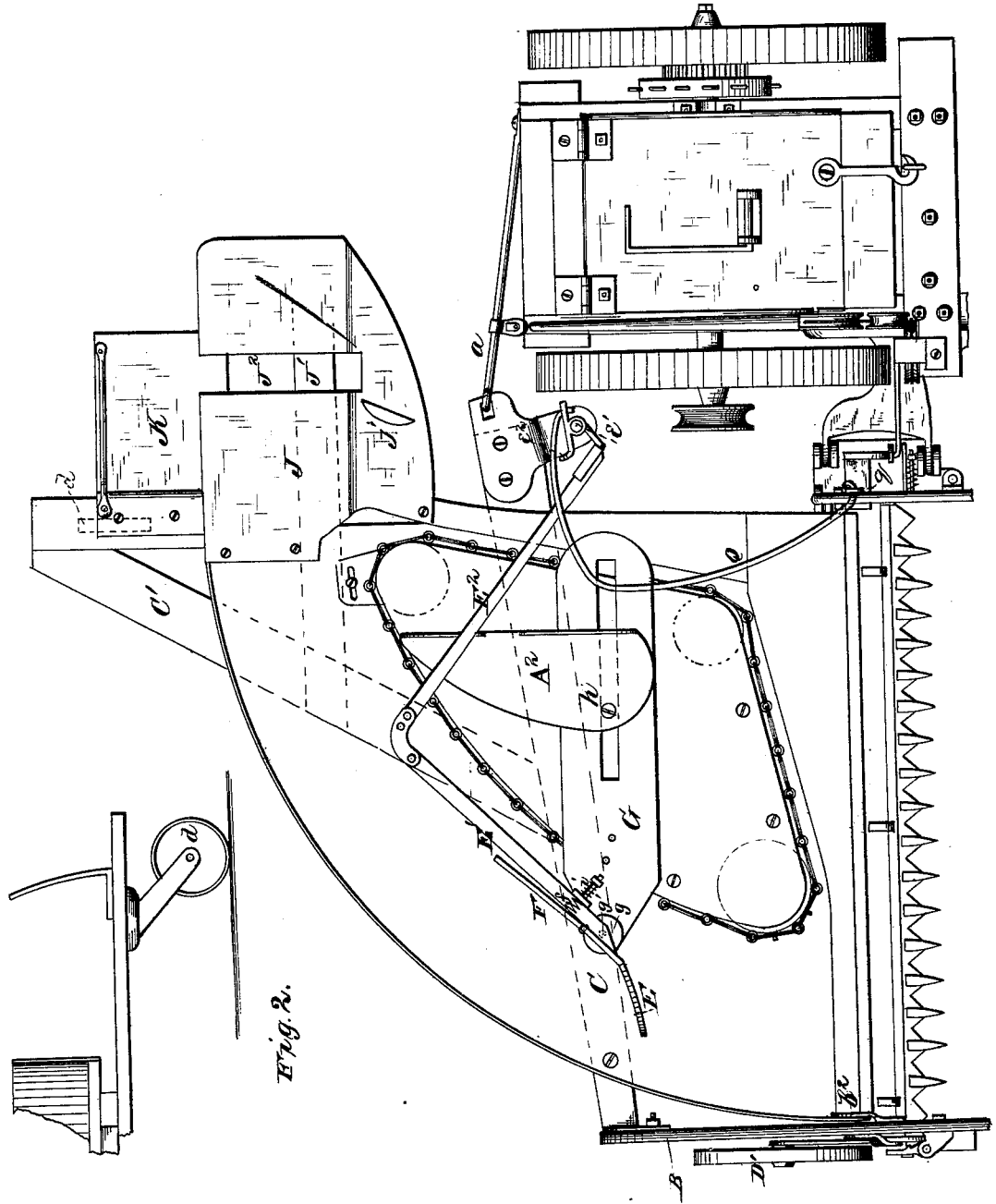

J. F. SEIBERLING.
Grain-Binder.
No. 206,834. Patented Aug. 6, 1878.
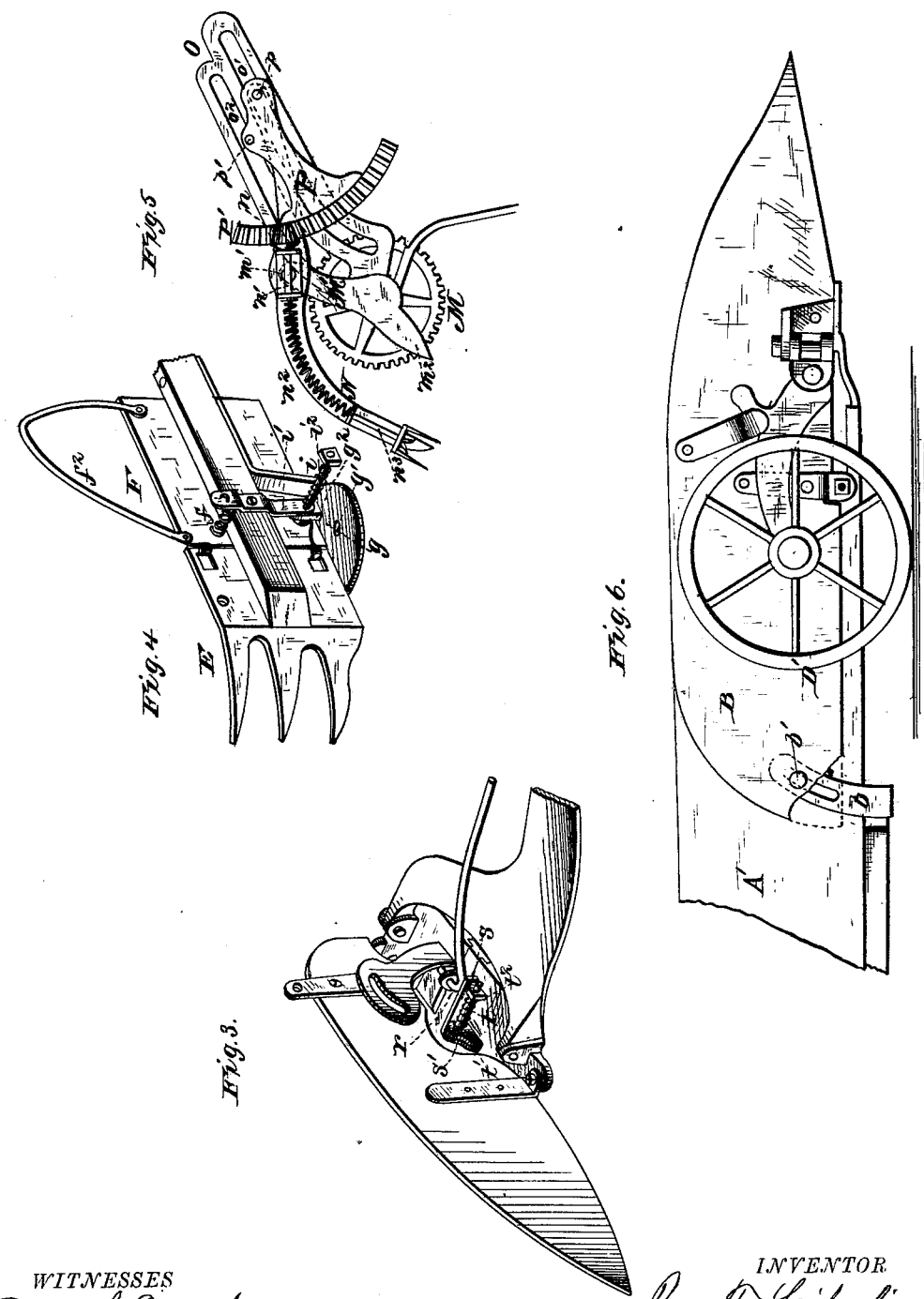
WITNESSES
INVENTOR
By
Attorney

UNITED STATES PATENT OFFICE.

JOHN F. SEIBERLING, OF AKRON, OHIO.

IMPROVEMENT IN GRAIN-BINDERS.

Specification forming part of Letters Patent No. 206,834, dated August 6, 1878; application filed May 25, 1878.

*To all whom it may concern:*

Be it known that I, JOHN F. SEIBERLING, of Akron, county of Summit, State of Ohio, have invented certain new and useful Improvements in Reaping-Machines, of which the following is a full, clear, and exact description, reference being had to the accompanying drawings, making part of this specification, in which—

Figure 1 is a perspective view of a reaping-machine, or so much thereof as is necessary to show my improvements. Fig. 2 is a plan view of the same. Fig. 2ª shows the rear end of the platform-frame and its carrying-wheel in elevation. Fig. 3 is a perspective view of the inner shoe and its attachments, showing the spring-latch for facilitating the connecting and disconnecting of the pitman and sickle-bar. Fig. 4 is a perspective view of the rake-head or fork. Fig. 5 is a side elevation of a portion of the binding mechanism, and Fig. 6 is a grain-side elevation of the outside divider and its attachments.

Similar letters of reference denote corresponding parts wherever used.

My invention relates, first, to a novel arrangement of the outer grain-guard or platform-fender relative to the divider-board, whereby it is left free to vibrate with the hinged platform and platform-rake, and whereby, also, it is adapted to receive and hold the gavel, independently of said divider-board, against the compressing and discharging action of the rake, as hereinafter explained.

It further relates to a novel manner of combining the fork or rake-head with its stale, whereby it is adapted to yield to conform to the size of the gavel.

It further relates to a novel arrangement of hinged guard or deflecting-rod at the inner side of the platform, adapted to rise to permit the fork to pass under it and to fall after the fork has passed by, and to certain other details of construction and arrangement hereinafter fully set forth.

The main or truck frame of the machine and the cutting apparatus, together with the coupling-frame connecting the cutting apparatus with the main frame, are similar to those in machines now in use, and need not therefore be described, except in so far as is necessary to explain the relation of my improvements thereto.

A represents the quadrant or circular platform, hinged at its forward edge directly in rear of the cutting apparatus, and provided on its outer curved side with the guard or fender-board A', extending to or slightly in advance of the forward edge of the platform on the inner side of the divider-board B, as shown. The rear end of the platform A is supported upon a triangular frame, C C', the forward transverse bar C of which is connected at its inner end by a hinged coupling-rod, $a$, with the main frame, and at its outer end with the rear end of the divider-board B by means of a slotted upright, $b$, and a through bolt or pin, $b^1$, permitting its adjustment or free vibration, as desired.

The rear end of the frame C' is supported by a caster-wheel, $d$, which follows the undulations of the ground, and the platform supported thereby rocks freely on its hinge-connection with the finger-bar to conform to the movements of said wheel. The divider-board B is rigidly connected with the outer shoe or outer end of the finger-bar supported upon a caster-wheel, D', as shown.

The divider-board is arranged outside of the curved platform guard or fender A', and is separate or disconnected therefrom, permitting the free and independent vibration of the fender-board with the platform. The divider-board has attached to it, in advance of the fender, a shield or angular plate, $b^2$, within or behind which the forward end of the fender is free to vibrate with the hinged platform, while at the same time said shield prevents the straw or grain, as it moves back over the cutters, from being caught upon the forward end of the fender-board. The divider extends back in a right line beyond the forward end of the curved fender, and the divergence of the two serves to assist in effecting a separation of the cut from the uncut grain, while by extending the curved fender inside of the divider-board to the forward edge of the platform, it is made to receive the gavel as it is moved outward by the table rake or fork hereinafter described.

The object of this arrangement of the fender relative to the divider-board is as follows: Where the fender is attached to the rear end of the divider-board in the usual way the platform has to be made longer than would otherwise be necessary, as the curve or arc of the circle must, under such construction, start from the rear end of the divider-board instead of the forward end of the platform, as in my construction, and the fork or rake to effect a clean delivery of the grain must move on a line parallel therewith before beginning its circular movement, and is thus required to take a short abrupt turn at the point of connection of the fender with the divider, instead of having a regular circular sweep from the finger-bar to the point of delivery, as in my construction, and, again, the obstructions to the delivery of the gavel consequent upon first compressing it against the divider-board, such as the bolts or other fastenings connecting the fender and other parts thereto, are all avoided by my construction. The rake or fork employed in effecting the removal of the grain from the quadrant-platform is similar, except in certain details hereinafter set forth, to that described in a former patent.

It consists of an angular-toothed head, E, connected with the outer end of a jointed stale, $E^1$ $E^2$, which at its inner end is connected, by a vertical pivot, $e'$, with the platform-frame bar C at the inner side of the platform, near midway of its length, as shown. The swinging end of the stale is connected, through a link or plate, $g$, (see Fig. 4,) with a slotted arm or plate, G, which slides upon and rotates around a stud or bolt at $h$, connecting the shield $A^2$ with the platform, said arm G being connected with and operated by means of an endless chain, H, driven by any suitable mechanism. The link $g$ is pivoted to the stale $E^2$ at its inner end, and its outer end, through an eye or perforation, $g'$, therein, engages with a pin on the driving-arm G. Just in rear of the eye $g'$ is an upright perforated lug or ear, $g^2$, and a bolt or headed pin, $i$, secured therein, and, passing through a pendent lug or ear, $i^1$, is surrounded by a spring, $i^2$, which allows the rake-head to yield relatively to its driving-arm to conform to the size of the gavel operated upon.

The rake-head E has an extension-plate, F, hinged to its heel end, held in place against the stale $E^1$ by a spring, $f$, which permits it to swing outward, operated by a cam-ledge, $j$, on the supplemental platform hereinafter described, for forcing the gavel from the fork or rake teeth and effecting its discharge in a compact form.

J is the supplemental platform connected directly with the delivery end of the quadrant-platform A, so as to receive the grain therefrom. This platform is supported by a transverse bar or frame, $J^1$, connecting it with the triangular frame $C'$ underneath the platform A, the connection being such as to adapt it and the supplemental platform to be readily detached and removed when it is desired to discharge the gavels directly from the quadrant-platform onto the ground. The platform is made, by preference, slightly concave in longitudinal section, for the purpose of retaining the gavel in compact form, and is provided with a central longitudinal slot at $J^2$, open at the rear for permitting the passage of the binder-arm through it, as will be explained.

The rear end of the triangular frame C $C'$, extending in rear of the discharging end of platform A, has a binder's stand, K, attached to it when the grain is to be bound by hand, said stand projecting laterally in rear of the supplemental platform J in position, adapting the binder or binders located thereon to pass his hand or arm through the slot $J^2$ for removing and binding the gavel.

When the grain is to be bound automatically the stand K is removed, and a standard, L, supporting the binding mechanism is applied in its place to the frame C $C'$, as shown in Fig. 1.

The standard L has a horizontal transverse sleeve, $L'$, formed upon or rigidly secured to its upper end, forming a bearing for a shaft, $m$, driven by a spur or sprocket wheel, M, by any suitable arrangement of mechanism connecting it with a driver on the truck-frame.

The opposite or outer end of the shaft $m$ has a crank-arm, $M'$, attached to it, through which motion is imparted to the reciprocating and vibrating binder-arm as follows: N is the binder-arm, pivoted at or near midway of its length on the crank-wrist $m^1$ of the arm $M'$, and, extending above said arm, has its upper end connected with a sliding pin at $p$. The pin $p$ is formed upon or attached to the upper end of a rack bar or arm, P, and moves up and down in a cam-slot, $o^1$, in a slotted cam-plate, O, attached to and projecting upward from one end of the sleeve $L'$, as shown. The cam-plate O has a second groove, $o^2$, and a second pin, $p'$, on the rack-arm P moves up and down therein.

These pins $p$ $p'$, either or both, may be armed with anti-friction rollers for facilitating their movement in the cam-slots $o^1$ $o^2$, if desired.

The outer swinging end of the rack-arm P is provided with a toothed beveled rack, $P''$, which, by its vibration, in connection with the vibration of the binder-arm N, imparts an intermittent rotary movement to a pinion, $n$, for operating the twisting devices, as will be explained.

The crank-arm $M'$ has a heel-extension, $m^2$, formed upon it, which strikes against the pin $p'$, for imparting a vibratory movement to arm P in one direction on pivot $p$, the vibration of said arm in the opposite direction being effected by its connection with the binder-arm N and its own gravity. Supposing the parts to be in the position shown in Fig. 5, with the binder-arm about to begin its operative stroke, the further rotation of the crank-arm $M'$ causes the arm to descend through the slot $J^2$ in the supplemental platform J in front of the gavel, and to sweep backward, carrying the bundle with it. In this backward movement of the binder and crank arms the heel-cam projection $m^2$ strikes the pin $p'$ and moves the rack forward, causing it to impart a rotary movement to the pinion $n$, for operating the wire-twisting mechanism.

As the crank-arm rises after its backward movement, lifting the binder-arm with it, the rack-arm P is forced upward through its connection with said arm, causing the pins $p\ p'$ to rise in the slots $o^1\ o^2$ to accommodate the movement of the crank-arm, and lifting the binding-arm over the new gavel on the platform J. As the binder-arm is vibrated forward the movement of the pinion $n$ over the rack P' is reversed, and the rack descends with the binder-arm N, with the parts again in position for repeating the movements described.

The pinion $n$ is secured upon a short shaft, $n^1$, mounted in suitable bearings on the arm N, and is connected by a flexible intermediate shaft, $n^2$, with a second short shaft, $n^3$, at the swinging end of the binder-arm, and to the outer end of this second shaft $n^3$ the twister is attached, rotation being imparted thereto through its connection with the pinion $n$ by the vibrations of the rack and binder arm, as explained.

Any suitable or preferred form of twisting device may be used, and when twine is used for the band instead of wire, a knotting device may be used instead of the twister; and any suitable material may be employed in lieu of the coiled wire shown for forming the flexible shaft-connection between said twister and its actuating-pinion, the object being to make said shaft conform substantially to the outline of the binder-arm, and to operate the twister arranged out of line with its actuating-pinion.

The specific construction and arrangement of the binding devices will be made the subject of a separate application, and they need not be further described here, the purpose of the description here given being mainly to show the relation of said parts to the quadrant and supplemental platforms.

The supplemental platform J in front of the concave has a cam-block, $j$, secured to it just where the throw of the heel-extension F of the rake or fork E terminates, so arranged that as the fork starts forward out of the gavel the hinged plate is held by the block $j$, and serves to free the gavel from the fork-teeth, and to leave it in compact shape on the platform J.

Q is a U-shaped deflecting rod or guard, hinged by its ends to uprights $e^1$ and $q$ at the inner side of the platform, the loop portion of the rod overhanging the inner side of the platform in an outwardly-inclined position, for deflecting the grain cut by the inner end of the cutting apparatus outward into position to adapt the fork or rake to act upon it and to prevent the rake from becoming entangled with or obstructed by it. This guard is upheld by a bracket or spur, $e^2$, on the upright $e^1$ in position, adapting the fork-head to pass under its rear arm, and an inclined rod, $f^2$, on the fork-head or hinged heel-piece F serves to lift the guard, as the rake moves forward, sufficiently to permit the rake to pass, after which the guard drops down behind the rake-head into the required position for deflecting the cut grain outward, as described.

For the purpose of facilitating the removal or the attaching and detaching of the sickle-bar from its driving connecting-rod, while at the same time preventing accidental displacement or disconnection of said parts, I employ a latch, $s$, (see Fig. 3,) pivoted at one end upon a sliding bolt or rod, $t$, mounted in a lug or ear, $t^1$, on the inner shoe in front of the point of attachment $r$ of the pitman to the sickle-bar, as shown. The rod or bolt $t$ has a spring, $t^2$, upon it between its head or nut and the lug $t^1$, which serves to hold the head or nut, at its outer end, up against an angular foot, $s'$, on the outer end of the latch, thereby clamping said foot snugly up against the outer face of the lug, and locking the latch $s$ in position behind the joint $r$, and keeping the wrist-pin on the pitman from backing out of the eye in the sickle-bar head.

The pitman can be attached by simply lifting the latch, overcoming the tension of spring $t$, and then backing the wrist-pin out of the eye in the sickle-bar head.

Having now described my improvements, what I claim as new, and desire to secure by Letters Patent, is—

1. The circular fender to the hinged platform extended forward inside of the divider-board to a point at or near the finger-beam, to which the divider-board is fixed, whereby the fork, as it sweeps the grain from the inside to the outside of the platform, will gather the grain against the fender instead of the divider, substantially as described.

2. The hinged guard-rod on the inside of the platform, arranged to raise up to permit the fork to pass and to descend after the fork has passed, substantially as described.

3. The angular latch $s$, in combination with the sliding bolt or rod $t$ and spring $t^2$, arranged and operating substantially as and for the purpose described.

4. The combination, with the divider-board, of the shield or guard covering the forward end of the vibrating fender, for preventing the straw from catching thereon, substantially as described.

5. The spring or yielding connection between the fork and its driving arm or mechanism, for the purpose set forth.

6. The combination of the binder-arm, the twister on the end thereof, the flexible shaft to revolve the twister, the small pinion and the circular rack to give motion to the flexible shaft and twister, substantially as described.

7. The combination of the circular rack, the slotted arm to guide the same, and the revolving lever or cam, substantially as described.

8. In combination with a quadrant-platform and a fork or rake that moves the grain to the point of delivery by pressing the gavel against the fender of the platform, and a supplemental platform to receive the gavel, a hinged tail extension-board or its equivalent on the fork, arranged with mechanism to move the grain away from the fork after the delivery of the gavel, so that the binding can be done without obstruction from the fork or fork-arm, substantially as described.

JOHN F. SEIBERLING.

Witnesses:
    J. F. STUVER,
    F. A. SEIBERLING.